US007478029B1

(12) United States Patent
Joffe

(10) Patent No.: US 7,478,029 B1
(45) Date of Patent: Jan. 13, 2009

(54) CABLE SIMULATION DEVICE AND METHOD

(75) Inventor: Daniel M. Joffe, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 531 days.

(21) Appl. No.: 10/980,066

(22) Filed: Nov. 3, 2004

(51) Int. Cl.
*G06F 17/50* (2006.01)

(52) U.S. Cl. ................. 703/15; 703/14; 716/5

(58) Field of Classification Search ............. 703/13–16; 434/219; 379/347; 370/358; 716/4, 5
See application file for complete search history.

(56) References Cited

U.S. PATENT DOCUMENTS

| 4,717,896 | A | | 1/1988 | Graham et al. |
| 4,800,344 | A | | 1/1989 | Graham et al. |
| 4,961,218 | A | * | 10/1990 | Kiko ........................... 379/347 |
| 5,208,846 | A | | 5/1993 | Hammond et al. |
| 5,738,525 | A | * | 4/1998 | Davies ....................... 434/219 |
| 6,480,029 | B2 | | 11/2002 | Morgan et al. |
| 6,670,830 | B2 | | 12/2003 | Otsuka et al. |

OTHER PUBLICATIONS

Pinault et al., S.C. Digital Characterization Techniques for the Analog Performance of Mixed-Signal Devices, IEEE Transactions on Circuits and Systems, vol. 40, No. 8, Aug. 1993, pp. 480-492.*
Cherubini et al., G. Adaptive Analog Equalization and Receiver Front-End Control for Multilevel Partial-Response Transmission Over Metallic Cables, IEEE Transactions on Communications, vol. 44, No. 6, Jun. 1996, pp. 675-685.*

* cited by examiner

*Primary Examiner*—Russell Frejd
(74) *Attorney, Agent, or Firm*—Thomas, Kayden, Horstemeyer & Risley, L.L.P.

(57) ABSTRACT

A cable simulator that comprises an input device configured to receive a communication signal. The cable simulator further comprises a circuit configured to simulate attenuation in both the differential mode and common mode components of a communication signal.

22 Claims, 5 Drawing Sheets

CABLE SIMULATION DEVICE AND METHOD

RELATED ART

Data communication systems employ various transmission schemes in order to transmit data from one communication device to another. One such data transmission scheme is differential data transmission. In differential data transmission, a transmitter transmits a signal on two signal lines, sometimes referred to as "tip" and "ring," and the difference between voltage levels of tip and ring forms the transmitted signal.

In addition to the differential voltage applied to the signal lines, the transmitter typically transmits a common-mode voltage that is common to both signal lines. In this regard, the differential voltage across the signal lines is the desired signal, and the common voltage signal is an unwanted signal that may have been coupled into the transmission line by a driver of the transmitter. A receiver that receives a signal having both differential and common-mode components typically rejects the common-mode component of the signal in order to obtain the desired differential component of the signal.

Communication devices, e.g., transmitters or receivers, are often designed and tested in a laboratory environment, and connecting two communication devices together using actual transmission lines at actual lengths for testing purposes is not always feasible. Therefore, a device that simulates the signal-carrying characteristics of a transmission line through which the signals travel from one device to another is often used. Such a testing device is sometimes referred to as a "cable simulator."

An actual transmission line exhibits various signal-carrying characteristics including differential and common-mode signal attenuation. The transmission line attenuates differential components of the signal by virtue of series impedance and a capacitance that appears between the signal lines, and the transmission line attenuates common-mode components by virtue of series impedance and a capacitance corresponding to the grounded shield of the transmission line between each signal line and ground.

Therefore, in order for the cable simulator to accurately simulate the characteristics of the transmission line, the cable simulator simulates a decrease in signal intensity representative of the attenuation that occurs in the actual transmission line. Notably, even though an actual transmission line attenuates both differential and common-mode components of the signal that are traveling through the transmission line, most cable simulators only simulate attenuation of the differential component of the signal.

However, limiting simulation of only differential mode attenuation in cable simulators sometimes poses a problem when the differential component attenuation reaches a critical level. In this regard, when differential mode attenuation exceeds approximately 60 to 80 decibels (dB), the common-mode component signal strength appearing at a communication device may well exceed the signal strength of the differential component.

SUMMARY OF THE DISCLOSURE

Generally, the present disclosure relates to a cable simulation device and method for providing attenuation to differential and common-mode components present in a communication signal.

A cable simulator in accordance with an embodiment of the present disclosure comprises an input device configured to receive a communication signal. The cable simulator further comprises a circuit configured to simulate attenuation of a common-mode component of the communication signal.

A cable simulation method in accordance with an embodiment of the present disclosure comprises the step of receiving and attenuating the differential component of a communication signal. The method further comprises the step of simulating attenuation of a common-mode component of the communication signal.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to a cable simulator for simulating a transmission line. In simulating the transmission line, the simulator simulates attenuation of both differential-mode and common-mode components present in a signal passing through the cable simulator.

Figure 1:
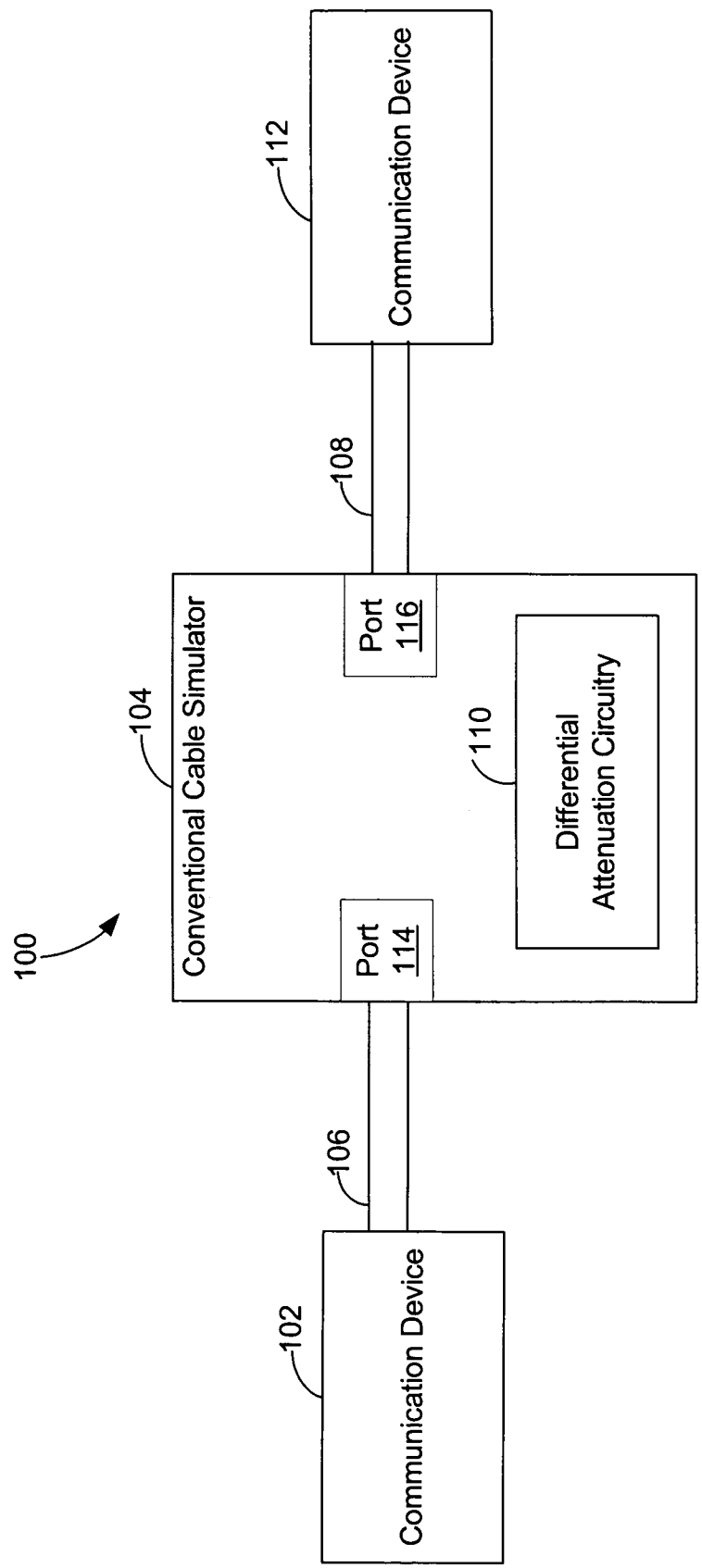
FIG. 1 is a block diagram illustrating a communication system that employs a conventional cable simulator for testing a communication device.

FIG. 1 depicts a communication system 100 that utilizes a conventional cable simulator 104 having only differential attenuation. The system 100 comprises a cable simulator 104 that connects a first communication device 102 at a first port 114 to a second communication device 112 at a second port 116. Cable 106, typically a length of several feet, connects communication device 102 to the cable simulator 104 at port 114, and cable 108 connects communication device 112 to the cable simulator 104 at port 116. The cable simulator 104 further comprises differential attenuation circuitry 110 that provides differential attenuation to the signal communicated between devices 102 and 112.

In operation, communication device 102 transmits a differential signal through cable 106 to the cable simulator 104 via the port 114. The cable simulator 104 then transmits the signal through the port 116 via the cable 108 to communication device 112. As the signal passes through the cable simulator 104, the cable simulator circuitry 110 attenuates the differential components of the signal, as if the signals were passing through an extended length of cable. Therefore, even though the devices 102 and 112 may be in close proximity to one another, the behavior of the signals can be accurately assessed for an actual application. Note that the cable simulator 104 can be configured in such a way as to enable it to simulate different lengths of cable.

The cables 106 and 108 can be any type of cable known in the art or future-developed that is capable of transmitting communication signals. Each cable 106 and 108 comprises at least a pair of transmission wires for carrying a communication signal between communication devices 102 and 112. For example, each cable 106 and 108 may comprise a pair of copper wires that are twisted together and sometimes referred to as a "twisted pair," although other types of connections may be used.

Figure 2:
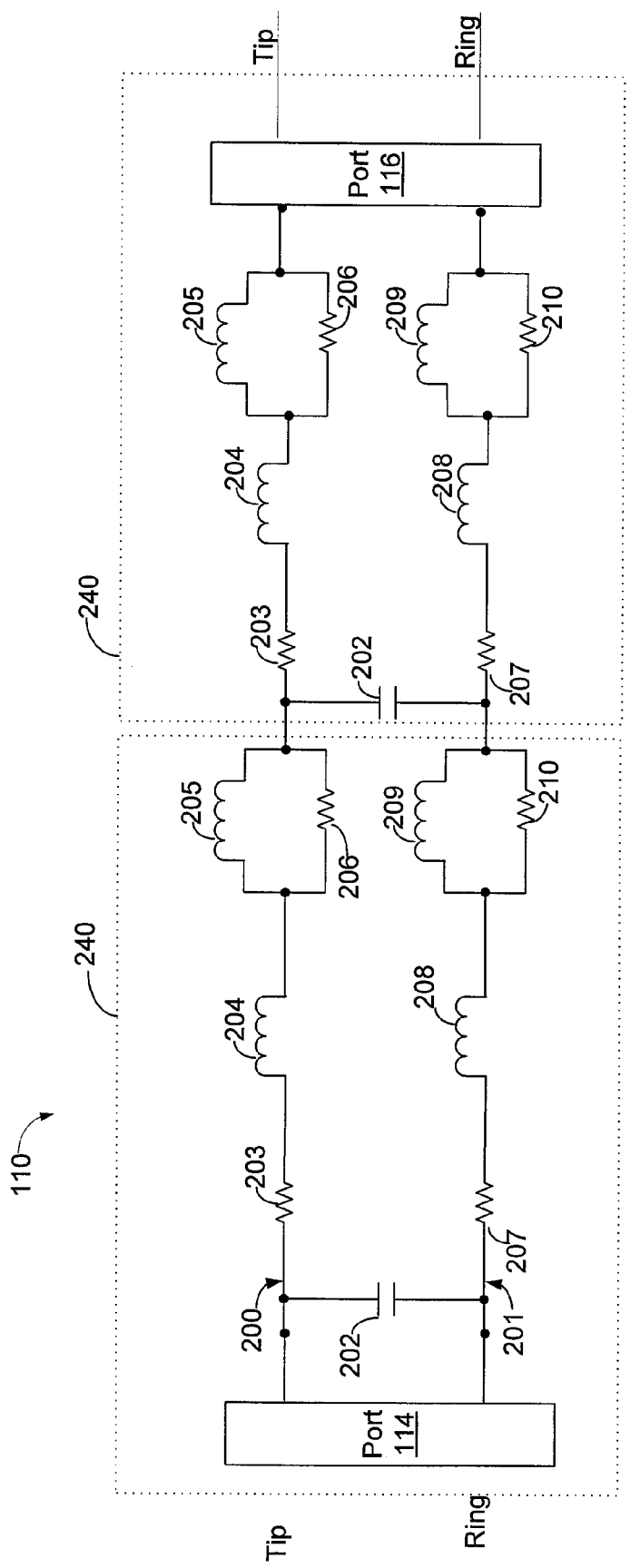
FIG. 2 is a block diagram illustrating a differential attenuation simulation circuit of the conventional cable simulator of FIG. 1.

FIG. 2 illustrates the differential attenuation circuitry 110 of FIG. 1 that provides differential attenuation. The circuit 110 receives a communication signal over two signal lines, hereinafter referred to as "tip" and "ring." Each circuit 110 can comprise a plurality of subsections 240 depending upon the length of transmission line that is simulated by the circuit 110. Each subsection 240 comprises parallel circuit paths 200 and 201, including the circuit path 200 for tip signal and the circuit path 201 for ring signal. The tip path 200 comprises a resistor 203 and an inductor 204 in series and an inductor 205 and a resistor 206 in parallel. Correspondingly, the ring path 201 comprises a resistor 207 and an inductor 208 in series and an inductor 209 and a resistor 210 in parallel. In addition, each subsection 240 comprises a parallel capacitor 202 that simulates the capacitance between tip and ring to attenuate the differential components of the signal received. Thus, each of the components 202-210 work together to model the transmission of the signal over a transmission line including modeling the differential attenuation of an actual communications cable with regard to the capacitance present from tip to ring.

FIG. 2 illustrates an embodiment having two identically configured subsections 240 connected in series. The line length simulated by the circuit 110 can be increased by increasing the number of subsections 240 and can be decreased by decreasing the number of subsections 240. In addition, although the subsections 240 are identically configured in FIG. 2, resistor, capacitor, and inductor values can be varied from subsection to subsection to more accurately reflect characteristics of an extended length of cable.

Figure 3:
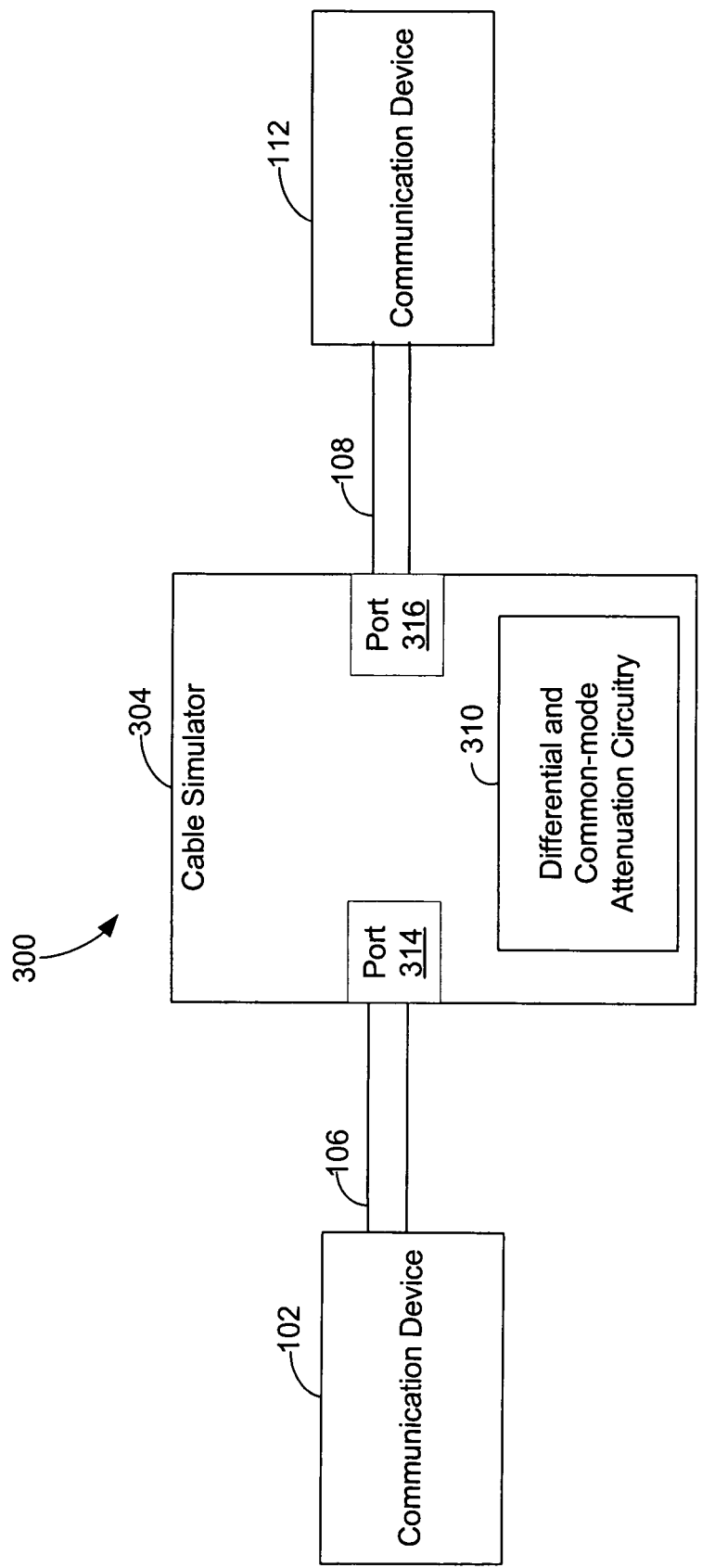
FIG. 3 is a block diagram illustrating a communication system that employs a cable simulator in accordance with an exemplary embodiment of the present disclosure.

FIG. 3 depicts a block diagram of a communication system 300 utilizing a cable simulator 304 with both differential and common-mode attenuation. The cable simulator 304 connects a first communication device 102 to a second communication device 112. Cable 106 connects communication device 102 to the cable simulator 304 via a port 314, and cable 108 connects communication device 112 to the cable simulator 304 via a port 316. The cable simulator 304 comprises differential and common mode attenuation circuitry 310 that provides differential and common-mode attenuation to the signals communicated between devices 102 and 112.

In operation, communication device 102 transmits signals through cable 106 to the cable simulator 304 via the port 314. The cable simulator 304 then transmits the signals through cable 108 to communication device 112 via the port 316. As a signal passes through the cable simulator 304, the circuitry 310 attenuates the differential and common-mode components of the signal as if the signals were passing through an extended length of cable. Therefore, the circuit 304 more accurately simulates the behavior of the signals in an actual transmission line as compared to the conventional cable simulation circuitry 110 of FIG. 1.

Figure 4:
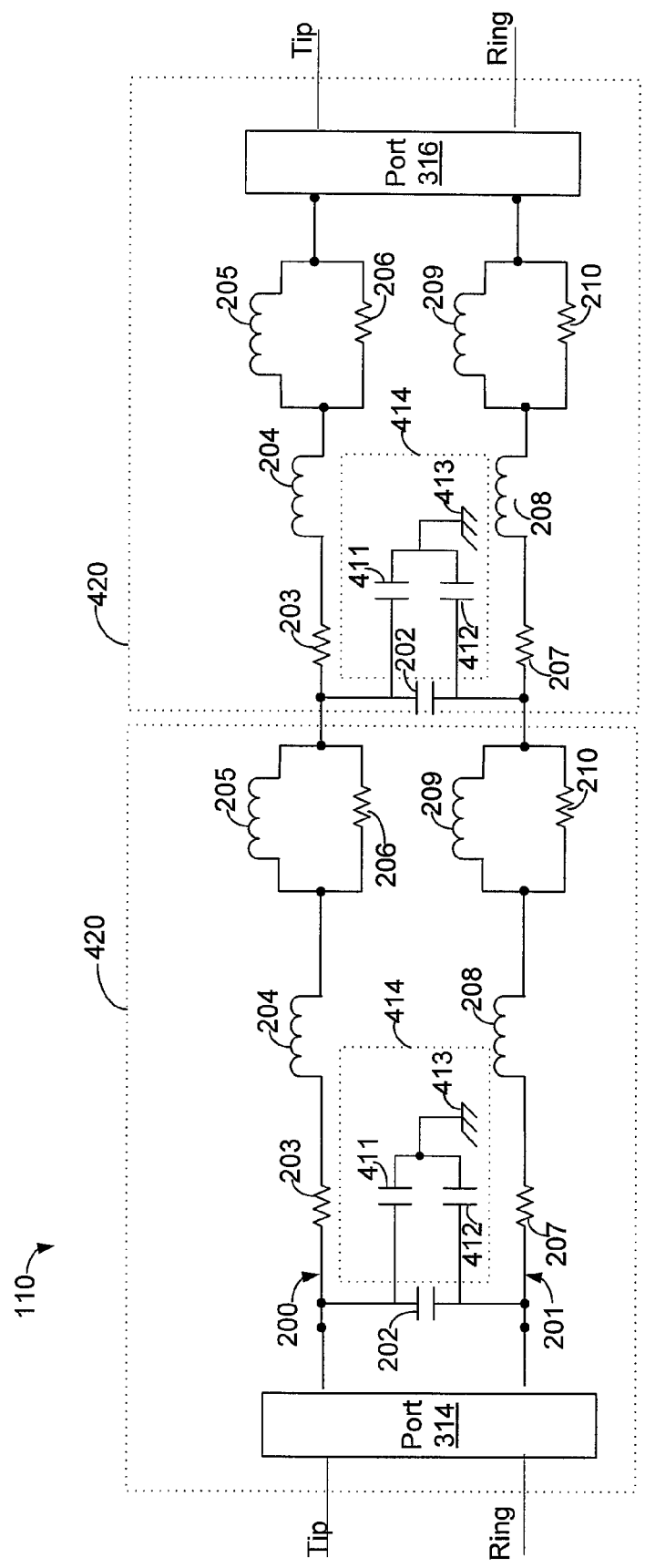
FIG. 4 is a diagram illustrating an exemplary circuit of the cable simulator of FIG. 3.

FIG. 4 is a circuit diagram illustrating an exemplary embodiment of the cable simulation circuitry 310 of FIG. 3. Cable simulation circuitry 310 preferably comprises at least one circuit subsection 420 that simulates the capacitive characteristics related to attenuation of common-mode components of an actual transmission line.

Each subsection 420 comprises parallel circuit paths 200 and 201, including the circuit path 200 for tip signal and the circuit path 201 for ring signal. In particular, the tip path 200 comprises a resistor 203 and an inductor 204 in series and an inductor 205 and a resistor 206 in parallel. Correspondingly, the ring path 201 comprises a resistor 207 and an inductor 208 in series and an inductor 209 and a resistor 210 in parallel. In addition, each subsection 420 comprises a parallel capacitor 202, which models the differential attenuation characteristics of an actual transmission line with regard to the capacitance present from tip to ring. Note that the number of subsections 420 can be increased or decreased to increase or decrease the simulated length of the transmission line.

As noted herein, an actual transmission line attenuates common-mode signals by virtue of the capacitive nature of the grounded shield of the cable, i.e., the common-mode signal is a measure of the voltage on each line with reference to ground. Thus, in order to accurately simulate the common-mode attenuation of an actual transmission line, the circuitry 310 simulates the common-mode attenuation by implementing capacitive components referenced to ground.

Therefore, in addition to the aforedescribed components 202-210, each subsection 420 further comprises a circuit 414 that models common-mode attenuation found in an actual transmission line. Such a circuit 414 in accordance with one embodiment of the present disclosure further comprises series capacitors 411 and 412 and a ground connection 413, sometimes referred to as a "center tap," between the capacitors 411 and 412 connected to ground 413. The circuit 414 can then be configured to simulate differential mode attenuation, common-mode attenuation, or a combination of differential mode and common-mode attenuation.

Actual wire pairs in a cable comprise different amounts of capacitive coupling to the grounded shield. This coupling varies from pair to pair, and on any given pair it also varies as a function of distance. The circuitry 310 can model these differences by adjusting the circuit 414. For example, a 75 foot length of cable is modeled differentially by a capacitance from circuit path 200 to circuit path 201 of 1200 picofarads (pF). If we make capacitor 202 1200 pF, the circuitry 310 models a cable section with only differential attenuation, and no common mode attenuation. At the other extreme, with reference to circuit 414, if capacitors 411 and 412 are both equal to 2400 pF and capacitor 202 is zero (0) pF, then there is a differential capacitance of 1200 pF from circuit path 200 to circuit path 201, but now have the maximum possible coupling to the grounded shield. This makes for the maximum amount of common mode attenuation to go along with the still correct amount of differential attenuation.

The circuitry 310 can synthesize a section 420 with the proper differential mode attenuation and common mode attenuation between these extremes by choosing, for example, a value of 1000 pF for capacitor 202, 400 pF for capacitor 411 and 400 pF for capacitor 412. In this case, the capacitance from circuit path 200 to circuit path 201 is still 1200 pF, i.e., 1000 pF in parallel with the series combination of two 200 pF, assuring the correct differential mode attenuation. However, the capacitance to ground is now 400 pF per conductor, rather than either 0 pF or 1200 pF.

Furthermore, in one exemplary embodiment, the configuration of each subsection 420 is identical to one another. Thus, corresponding resistors, capacitors, and inductors in different subsections 420 have the same resistance, capacitance, and inductance values, respectively. However, such a feature is not necessary to implement circuit 310 for differential and common-mode attenuation simulation.

For example, in the circuit 310 of FIG. 4, the resistance, capacitance, and inductance values of corresponding resistors, capacitors and inductors may be varied to more accurately reflect the characteristics of a transmission line depending upon the length and behavior of the transmission line that is being simulated. In this regard, the capacitance that goes to ground in an actual cable is a function of the length of the cable. Thus, varying the capacitance capacitors 202, 411, and 412 for different subsections 420 may more accurately reflect the behavior of an actual cable.

Figure 5:
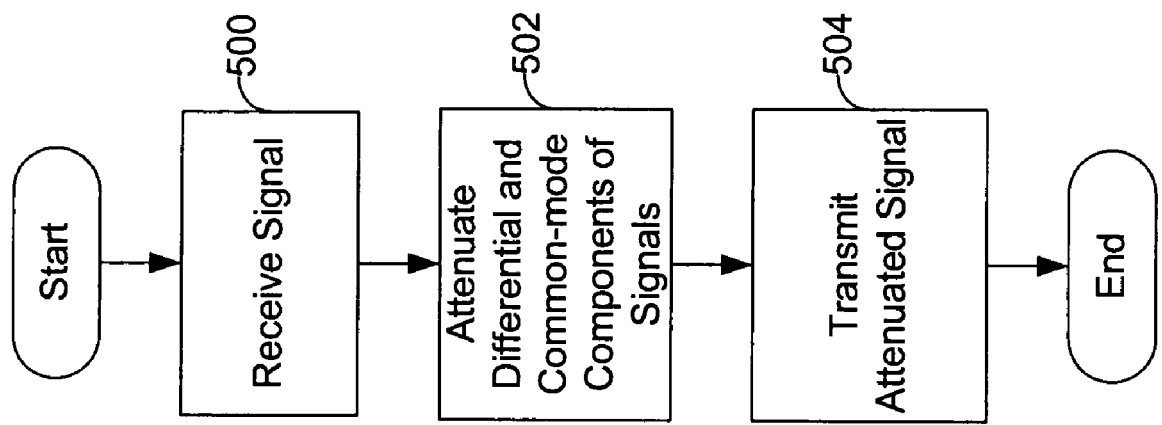
FIG. 5 is an exemplary architecture and functionality of the simulation circuit of FIG. 4.

An architecture and functionality of the circuit 310 of FIG. 4 is now described with reference to FIG. 5.

A signal is received from a communication device 102 (FIG. 3) that comprises differential and common-mode voltage components, as indicated in step 500. Circuit 310 receives the signal via the tip and ring paths 200 and 201, respectively.

As the signal travels through the circuit 310, the circuit 310 attenuates both the differential and common-mode components of the signal, as indicated in step 502. The circuit 310 attenuates the differential component via the capacitor 202 that models the capacitance present between tip and ring in an actual transmission line. The circuit 310 attenuates the common-mode component of the signal via the capacitors 411 and 412 that model the capacitance present between tip and ground and ring and ground by virtue of the shield encasing an actual transmission line.

After passing through circuit 310, the cable simulator 304 transmits the attenuated signal to a communication device 112, as indicated in step 504.

Now, therefore, the following is claimed:

1. A cable simulator, comprising:
    a first port;
    a second port; and
    a circuit coupled to the first and second ports, the circuit configured to attenuate a common mode component and a differential mode component of a communication signal received by the first port such that the circuit simulates transmission of the communication signal through a transmission line, the circuit further configured to transmit the communication signal to the second port, wherein the circuit is configured to attenuate the common mode component via circuit components that model a tip-to-ground capacitance and a ring-to-ground capacitance of the transmission line.

2. The cable simulator of claim 1, wherein the circuit is further configured to attenuate the differential mode component of the communication signal via circuit components that model a tip-to-ring capacitance of the transmission line.

3. The cable simulator of claim 1, wherein the circuit comprises:
    a tip path having a series resistor and inductor and having a parallel resistor and inductor;
    a ring path having a series resistor and inductor and having a parallel resistor and inductor; and
    wherein the circuit components that model the tip-to-ground capacitance and ring-to-ground capacitance are connected across the tip path and the ring path.

4. The cable simulator of claim 3, wherein the circuit components that model the tip-to-ground capacitance and ring-to-ground capacitance comprise a series arrangement of capacitors connected across the tip path and the ring path, and wherein a center tap between the capacitors is connected to ground.

5. The cable simulator of claim 1, wherein the circuit is a passive circuit.

6. A cable simulation circuit, comprising:
    a tip path;
    a ring path in parallel with the tip path;
    a first capacitor in series with a second capacitor connecting the tip path and the ring path; and
    a ground connection positioned between the first capacitor and the second capacitor for simulating a capacitance between the tip path and ground and the ring path and ground,
    wherein the tip path comprises a series resistor and inductor and a parallel resistor and inductor.

7. The cable simulation circuit of claim 6, wherein the ring path comprises a series resistor and inductor and a parallel resistor and inductor.

8. The cable simulation circuit of claim 7, wherein the tip path and the ring path are connected by a series arrangement of capacitors.

9. The cable simulation circuit of claim 8, wherein the series arrangement of capacitors comprises a first capacitor and a second capacitor, and wherein the cable simulation circuit further comprises a center tap positioned between the first and second capacitor and connected to ground.

10. A cable simulation method, comprising:
    receiving a communication signal at a first port;
    transmitting the communication signal from a second port; and
    simulating transmission of the communication signal through a transmission line of a particular length such that the communication signal, when transmitted from the second port, is attenuated relative to the communication signal, when received by the first port, by an amount consistent with the communication signal having been transmitted through the transmission line, the simulating comprising attenuating a common-mode component of the communication signal via circuit components that model a tip-to-ground capacitance and a ring-to-ground capacitance of the transmission line, the simulating further comprising attenuating a differential mode component of the communication signal.

11. The method of claim 10, wherein the circuit components are passive.

12. A cable simulation method, comprising:
    receiving a communication signal, wherein the communication signal comprises a tip signal and a ring signal; and
    simulating attenuation of a common mode component of the communication signal by a transmission line, wherein the simulating further comprises the step of simulating a capacitance between the tip signal and the ring signal, wherein the simulated capacitance reflects an overall capacitance between a tip signal and a ring signal of the transmission line.

13. The method of claim 12, wherein the simulating attenuation of the common-mode component step comprises the steps of simulating a tip-to-ground capacitance and simulating a ring-to-ground capacitance of the transmission line.

14. A cable simulator for attenuation of differential and common-mode signals having a ladder structure, comprising:
    a tip path having a series resistor and inductor and having a parallel resistor and inductor;
    a ring path having a series resistor and inductor and having a parallel resistor and inductor; and
    a series arrangement of capacitors connected across the tip path and the ring path wherein a center tap between the capacitors is connected to ground.

15. A cable simulator, comprising:
    a first port;
    a second port; and
    a circuit coupled to the first and second ports, the circuit configured to attenuate a common mode component and a differential mode component of a communication signal received by the first port such that the circuit simulates transmission of the communication signal through a transmission line, the circuit further configured to transmit the communication signal to the second port, wherein the circuit has a tip path and a ring path, and wherein the circuit has a series arrangement of capacitors connected across the tip path and the ring path.

16. The cable simulator of claim 15, wherein the circuit is a passive circuit.

17. The cable simulator of claim 15, wherein a center tap between the capacitors is connected to ground.

18. The cable simulator of claim 17, wherein the tip path has a series resistor and inductor and has a parallel resistor and inductor, and wherein the ring path has a series resistor and inductor and has a parallel resistor and inductor.

19. A cable simulation circuit, comprising:
a tip path;
a ring path coupled to the tip path, the tip path and the ring path configured to attenuate a differential mode component of a communication signal thereby simulating transmission of the communication signal through a transmission line of a particular length such that the differential mode component is attenuated by an amount consistent with the communication signal having been transmitted through the transmission line; and
circuit components connected across the tip path and the ring path, the circuit components configured to attenuate a common mode component of the communication signal thereby simulating transmission of the communication signal through the transmission line such that the common mode component is attenuated by an amount consistent with the communication signal having been transmitted through the transmission line.

20. The cable simulation circuit of claim 19, wherein the cable simulation circuit is a passive circuit.

21. The cable simulation circuit of claim 19, wherein the circuit components comprise a series arrangement of capacitors connected across the tip path and the ring path.

22. The cable simulation circuit of claim 19, wherein the tip path has a series resistor and inductor and has a parallel resistor and inductor, and wherein the ring path has a series resistor and inductor and has a parallel resistor and inductor.

* * * * *